(12) United States Patent
    Chompff

(10) Patent No.: US 9,171,242 B2
(45) Date of Patent: ***Oct. 27, 2015

(54) CODED INFORMATION BEARING IDENTIFICATION TAGS FOR CABLES

(71) Applicant: Conrad Louis Chompff, Concord, CA (US)

(72) Inventor: Conrad Louis Chompff, Concord, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/987,399

(22) Filed: Jul. 23, 2013

(65) Prior Publication Data

US 2015/0028111 A1    Jan. 29, 2015

(51) Int. Cl.
    *G06K 19/06*    (2006.01)
(52) U.S. Cl.
    CPC .... *G06K 19/06037* (2013.01); *G06K 19/06046* (2013.01)
(58) Field of Classification Search
    CPC ........ B65D 41/00; B65D 41/46; G09F 3/205; G09F 3/0295; H02B 13/344; H01R 13/465
    USPC .......... 235/494, 487, 462.09, 462.08, 462.01, 235/454, 439, 435; 40/316, 665
    See application file for complete search history.

(56) References Cited

U.S. PATENT DOCUMENTS

| | | | | |
|---|---|---|---|---|
| 3,765,578 A * | 10/1973 | Stull | ............................ | 222/546 |
| 3,877,598 A * | 4/1975 | Hazard | ........................ | 215/224 |
| 4,002,275 A * | 1/1977 | Crowle et al. | ................. | 222/543 |
| 5,315,774 A * | 5/1994 | Chompff | ........................ | 40/316 |
| 7,963,056 B1 * | 6/2011 | Mangone, Jr. | .................. | 40/316 |
| 8,516,727 B1 * | 8/2013 | Maraia | ............................ | 40/316 |
| 2003/0066218 A1 * | 4/2003 | Schweikert | ................ | 40/299.01 |
| 2004/0035029 A1 * | 2/2004 | Forsberg | ........................ | 40/316 |
| 2008/0133047 A1 * | 6/2008 | Best et al. | ..................... | 700/215 |
| 2011/0025468 A1 * | 2/2011 | Longhurst et al. | ........... | 340/10.1 |
| 2014/0097239 A1 * | 4/2014 | Bayliff et al. | ................. | 235/375 |

* cited by examiner

*Primary Examiner* — Thien M Le
*Assistant Examiner* — Claude J Brown
(74) *Attorney, Agent, or Firm* — Mark C. Jacobs

(57) ABSTRACT

A information bearing device into which several wires or a cable can be disposed, for the display of QR code information pertaining to the wires or cable. The device includes a first indicia bearing engaging portion and a second receiving portion for mounting the device on a wire(s) or cable. QR code or micro QR code indicia may be printed directly onto the surface of the engaging portion, or the indica may be added to the indicia receiving surface by placement of self adhesive QR code containing tabs to be read by QR code readers, cameras and smart phones.

18 Claims, 4 Drawing Sheets

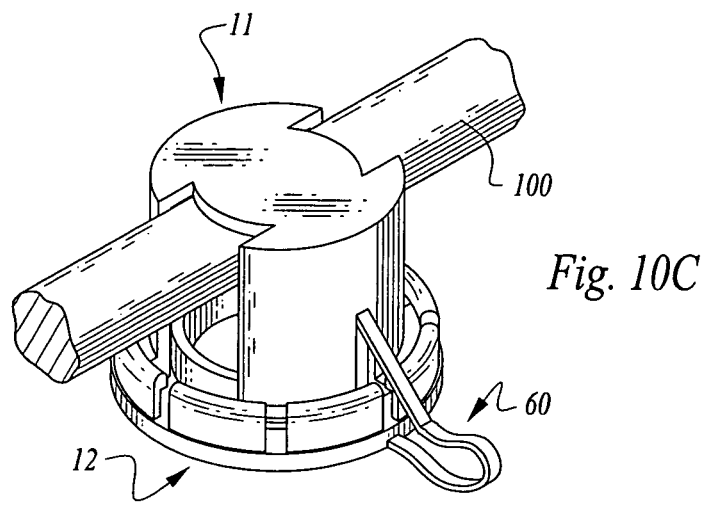
Fig. 10C
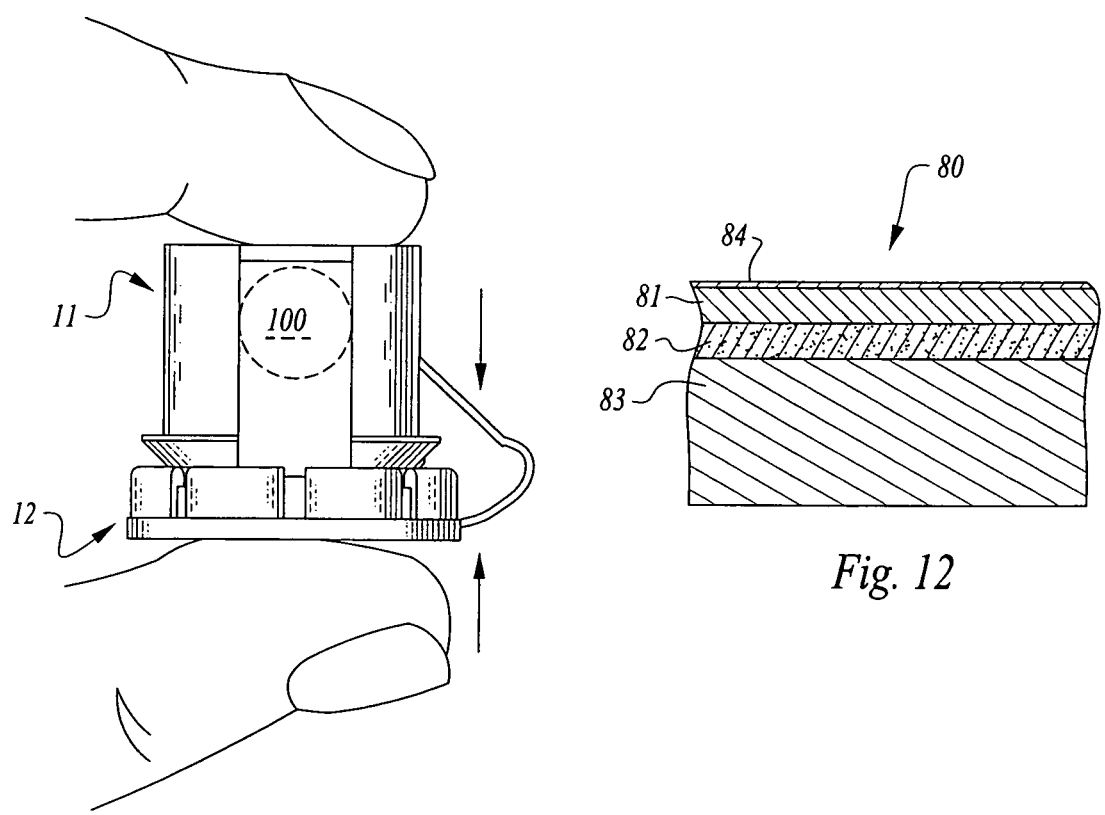
Fig. 11
Fig. 12

CODED INFORMATION BEARING IDENTIFICATION TAGS FOR CABLES

FIELD OF INVENTION

This invention relates to cable management in general and information bearing plastic tags that mount on cables used primarily in small and large computer systems.

BACKGROUND OF THE INVENTION

Our computer systems at both home and at the office are getting more complex with more and more components including a multiplicity of printers for the same or plural users, and large numbers of work stations attached to a single or several servers, and multi-office phone systems, the need to follow and identify each component and each user's components becomes more complex. In industry the problems of user and component identification is even greater, with wires and cable everywhere, for work stations, phone systems, facsimiles, and networking, the modern large office and industrial IT setting is a sea of cables of all dimensions and colors, everyone of which needs to be identified now and in the future.

While oft times, all of the cables to be identified are located in one room, just as often, the cables may extend to various floors of a building and even to several buildings. Thus one may not be able to follow to identify a cable coming from down the hall to the IT room, when all cables are either black or brown, and most of the same size.

In a multi-room home theater/sound setup it is next to impossible to determine which are the leads to the livingroom speakers, and which go to the master bedroom. This is another of the plethora of instances, where wire and cable tracing is either not practical or is difficult to employ.

Indeed, there are of course other situations that arise in our daily lives outside of the Information Technology world wherein it would be helpful to have indicia notations pertaining to wires and cables for the purpose of giving warnings, limitations on use; directions and other information. For example wiring of differing voltages, such as 110 Volt AC versus 12 Volt DC; power lines versus speaker "cables" among others.

Many IT rooms have racks and racks of component wiring, with stacks and stacks of cables, all of which look alike. But none of which are self-identifying. Thus rack organizers have come to be to segregate cables for future easy identification. Such rack organizers are made by A "N D Cable Products, Inc. among others. While rack organizers are helpful to provide neatness, to render identification easier of any one cable, organizers organize they do not identify cables and wires. That is the job of this invention for use in large industrial and commercial settings as well as in the homes of the affluent. That is because there is a real need for a means to notate specific wires and cables with information as to their location or function.

BRIEF DESCRIPTION OF THE FIGURES

FIG. 11 is a front elevational view of this device in closed position.
FIG. 12 is a diagrammatic representation of the QR code carrying tabs forming part of this invention.

SUMMARY OF THE INVENTION

A notator adapted to be mounted directly onto individual wires and cables for the display of information pertaining to the wire or cable itself or the wires within the cable as the case may be. The device includes a first indicia bearing engaging portion and a second receiving portion for mounting the device on a wire or cable. QR code/micro QR code indicia may be added to the indicia receiving surface by placement of self adhesive QR code containing tabs.

It is a first object of this invention to provide a device having two primary portions, one of which is for the reception of data and the other of which is a cable/wire receiving means.

It is another object to provide an information notator that is integrated into a device that is directly mountable on a cable or wire.

It is a third object to provide an indicia notator whose first portion can be made in various sizes to receive both standard and micro-QR code information.

It is a fourth object to provide a cable/wire notator that can receive indicia in direct printed on the surface form as well as by the application of pre-printed self adhesive tabs.

These and other objects of the invention will in part be obvious and will in part appear hereinafter.

The invention accordingly comprises the device possessing the features, properties and the relation of components which are exemplified in the following detailed disclosure and the scope of the application of which will be indicated in the claims.

For a fuller understanding of the nature and objects of the invention reference should be made to the following detailed description taken in conjunction with the accompanying drawings.

DESCRIPTION OF THE PREFERRED EMBODIMENT

Device 10 includes a first information carrying portion 12, designated s the engaging portion, and a second retainer portion 12 that matingly engages the first portion and which also receives the cable/wire therein. The retainer portion 12 is fixedly attached to the first or indicia carrying portion by a junction member, 60 which itself has several elements which will be described supra. For ease and convenience of the reader, all parts of the engaging portion 12 are even numbers, while all parts of the receiving portion 11 are odd numbered.

Figure 1:
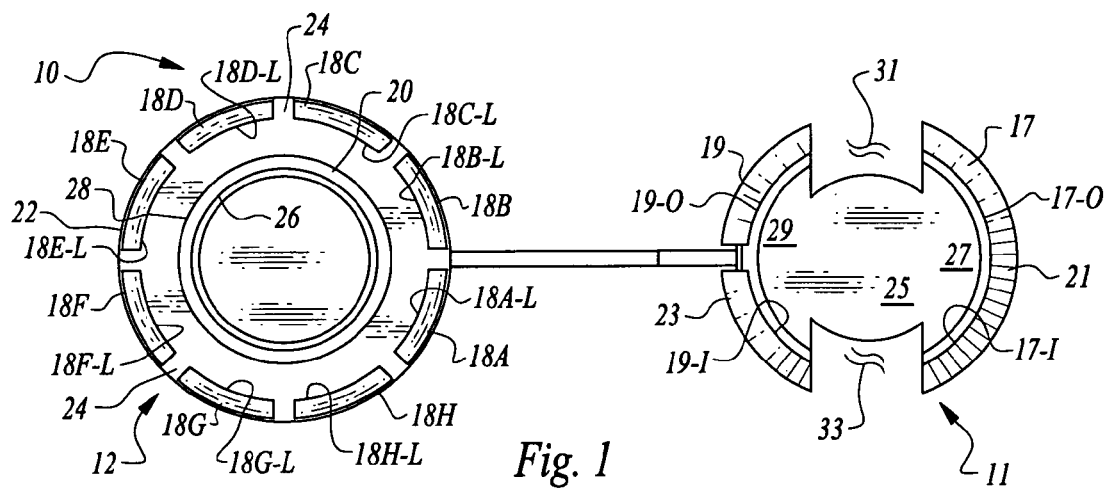
FIG. 1 is a top plan view of the device of this invention.
Figure 2:
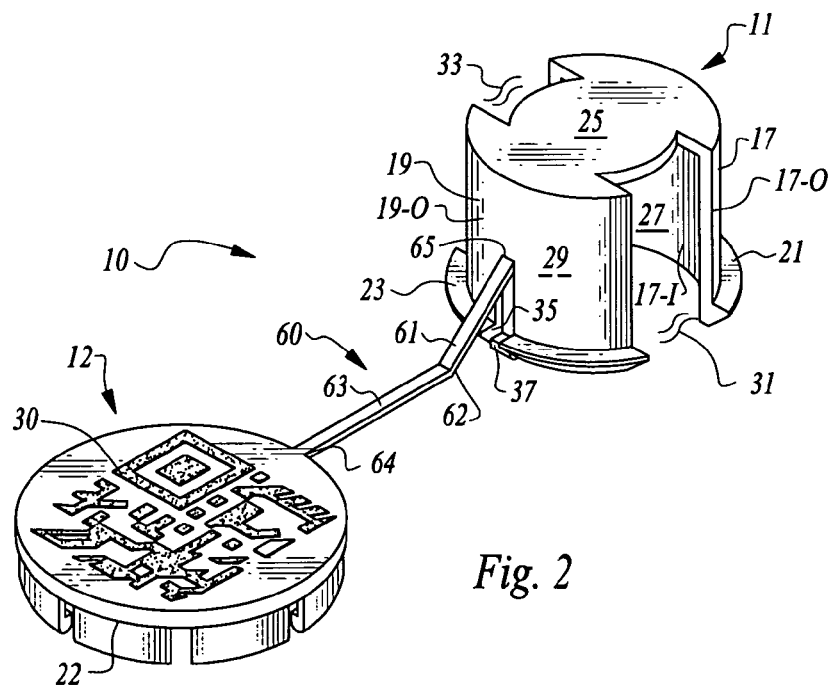
FIG. 2 is a bottom perspective view of this device.

FIG. 1 depicts device 10 in a top plan view, of both the first Engaging portion 12 and a second Receiving portion 11. FIG. 2 is a bottom perspective view of each of these two portions as well as the flexible junction member 60 which is seen to be connected to the proximal edge of each of these. The junction member 60 is discussed in detail in FIG. 2.

As seen in FIG. 1, the engaging portion 12 is round in cross section, and has a flat outer surface, while on the reverse or inner surface as seen in FIG. 1, there is a flat base 22 having a central annulus shaped segment 20, the donut hole of which is designated 26. There is a second flat area also round in configuration outside the annulus 20, and which is designated 28. Spaced from the flat area 28 at the outer edge of the base 22 is a series, here eight (8) of upstanding spaced wall segments each with an inward extending lip at the top thereof. These spaced wall segments are designated 18A-18H. Each wall segment's inward extending lip is designated with the same numerical designator followed by a dash L, such as 18F-L. The space or gap on the base 22 between each wall segment is designated 24. While 8 wall segments are shown, there is no criticality to the number which could be greater or lesser than 8 such as six or ten.

The second portion 11 of this device is seen to comprise a cup-like portion having a disc base 25 and two upstanding spaced side wall segments, 17 and 19 each of which has a semi-circular base 27,29 which side wall bases, 27,29 are attached to the disc base 25 along their respective diameters. The inner surface of the wall segments are designated 19-I And 17-I respectively, while the outer surfaces as seen in FIG. 2 are designated 17-O and 19-O respectively. Each wall segment 17,19 has an outward extending top lip, 21, 23, each lip having an arcuate side surface and a horizontal bottom surface normal to the wall itself. These surfaces are best seen in FIGS. 3 & 4, and designated numerically on such drawing figures.

Figure 4:
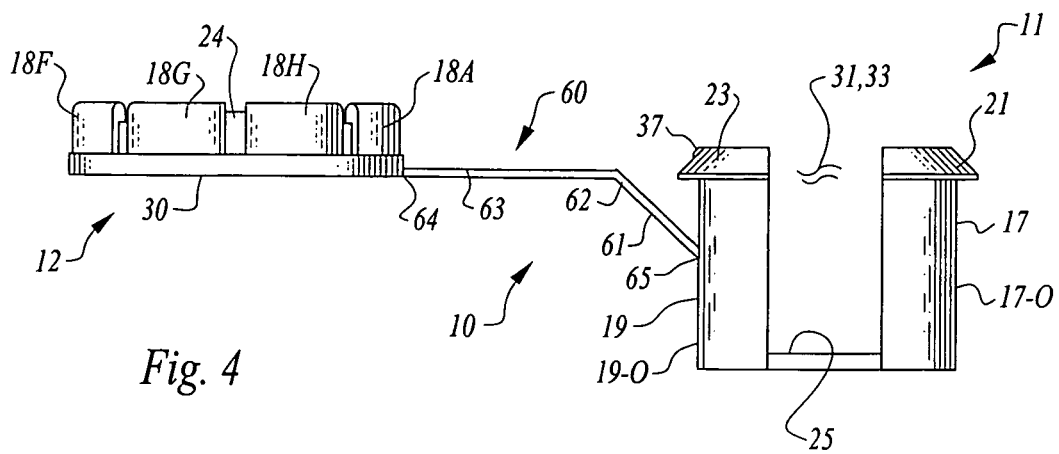
FIG. 4 is a side elevational view thereof.
Figure 5:
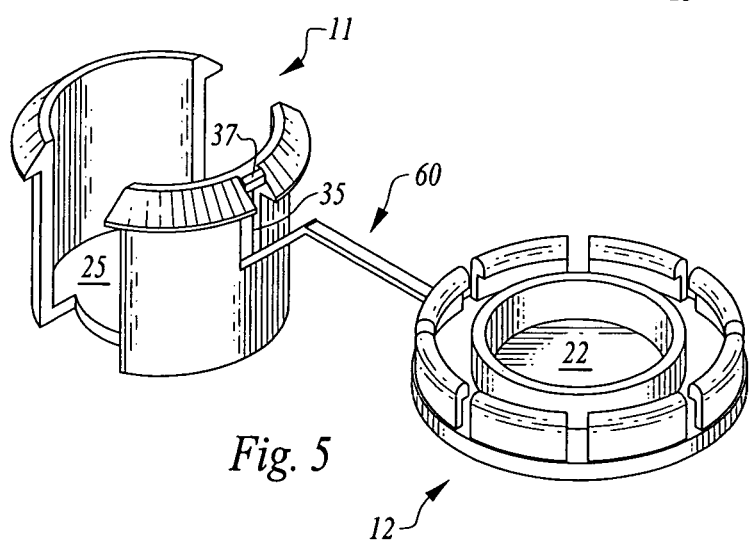
FIG. 5 is a top perspective view of this device.

If one looks carefully at lip 23, it is seen that in the middle thereof there is a slight recess 35, which is also seen in FIG. 5, and a tiny raised bump 37 that stands upward from the lip and serves as an impact point when the two main portion are joined together. See also FIG. 4.

There are dual aligned vertical interruptions 31,33 which separate the wall segments 17,19 and which extend the full height of the wall segments, even past the base 25. These two interruptions together form a slot 31-33 for the reception of wires or cable. The underside of the two semi-circular bases and the underside of the disk are all in the same plane and the elevation Let us now turn to FIG. 2. Here the details of the junction member 60 can be seen. Junction member 60 has a first shorter rod like segment 61 that is attached flexibly to the outside surface 19) of the left hemisphere 19 at about the midpoint of the elevation thereof. A longer flexible rod like member 63 is connected on one end to the shorter rod like member not at its terminus, but spaced up from the distal end (the end not attached to the surface 19-O) at point 62, and is disposed at an angle of about 120 degrees The other end of rod like member 63 is connected at the base 22 of portion 12 at the edge thereof. Notation tab 30—details of which will be set forth below in the discussion of FIG. 12 is seen disposed on the outer surface of the base 22, See also FIG. 3.

Figure 3:
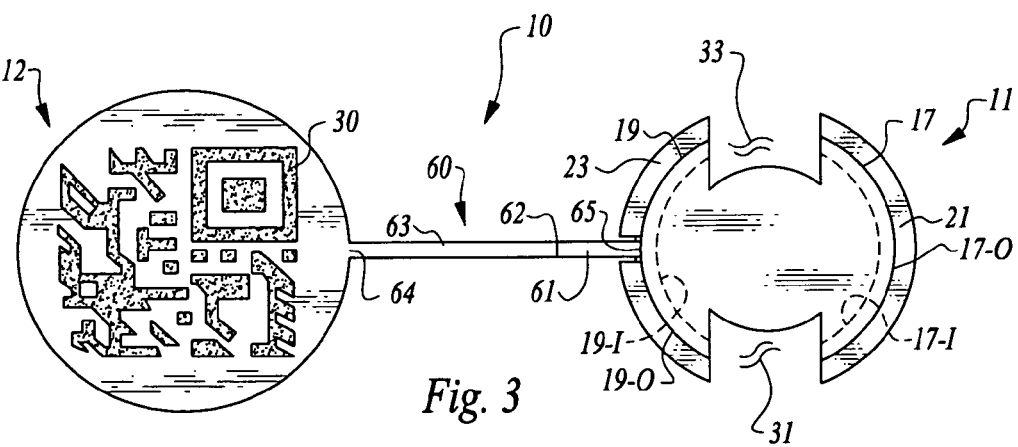
FIG. 3 is a bottom plan view of the device.

Here in FIG. 3, the connection of long rod like segment 63 at point 64 on the edge of the base 22 is seen. A viewing of FIGS. 2 & 3 together allows the reader to appreciate the shape of the lips 21, 23 with their outward extending arcuate side surface, and horizontal bottom surface, normal to the respective side wall surface.

Figures 6, 7:
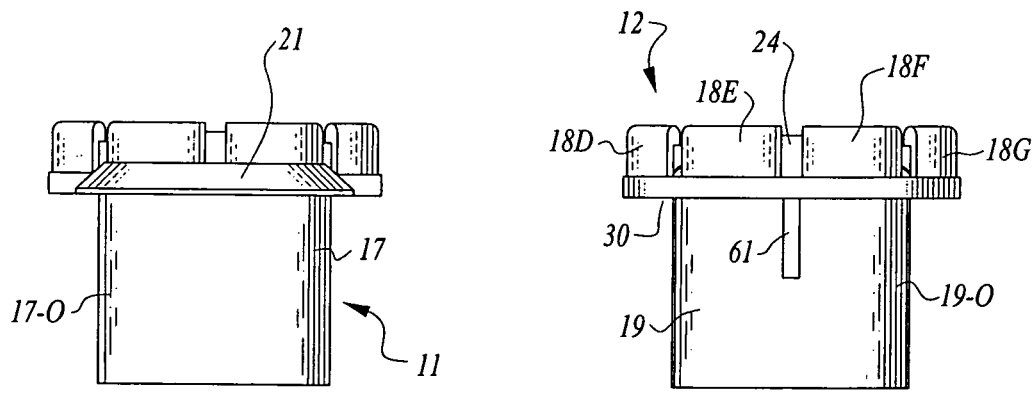
FIG. 6 is a side elevational view taken from the Engaging side of the device.
FIG. 7 is a side elevational view taken from the Receiving side of the device.

In FIG. 4, wherein portion 12 has been rotated to the right side of the FIGURE, the raised bump 37 can be seen on the hemisphere 19's lip 23. FIG. 5 is a top perspective view that best illustrates the placement of the recess 35 in the lip 23, just below the raised bump 37. FIG. 6 is a bottom perspective view of this device in open position taken from the end of the engaging portion. Since all aspects seen in this FIGURE have been described elsewhere herein, there is no need for further discussion. The same is true for FIG. 7 which is a top perspective view taken from the opposite end of the device in open position.

Figure 8:
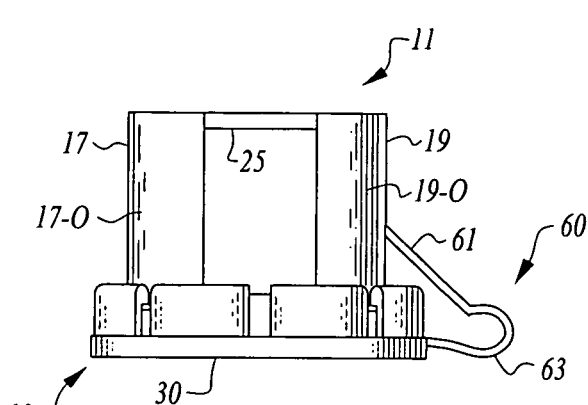
FIG. 8 is an elevational view of the device in engaged or in use position.
Figure 9:
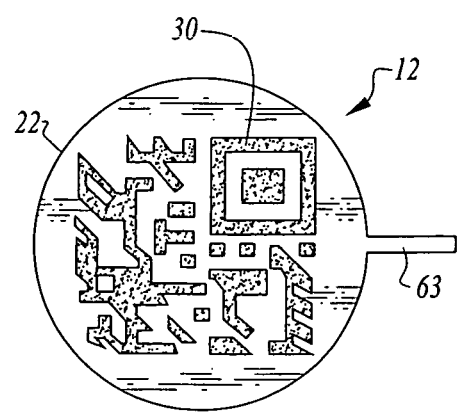
FIG. 9 is a top view of the device in engaged or closed position.

All of the discussion above has been about the device 10 when in open position prior to the disposition of wire(s) or a cable therein. FIG. 8 is an elevational view wherein the cap or engaging portion 11 has been snapped onto the receiving portion 12 as will be illustrated in FIG. 10 a diagrammatic view of the "action". Note how rod like member 61 has retained the same basic disposition, while flexible rod-like member 63 has rotated into an arc from its former generally flat disposition. Refer back to FIG. 2. FIG. 9 is a top plan view related to FIG. 8 in that it depicts the device in a closed position. The notation tab 30 is readily seen on what has been earlier designated as the underside of the base, 22 of the engaging portion 12. How to go from the open position as shown in FIGS. 1,2 and 3 among others will be discussed with respect to FIG. 10.

Figure 10A:
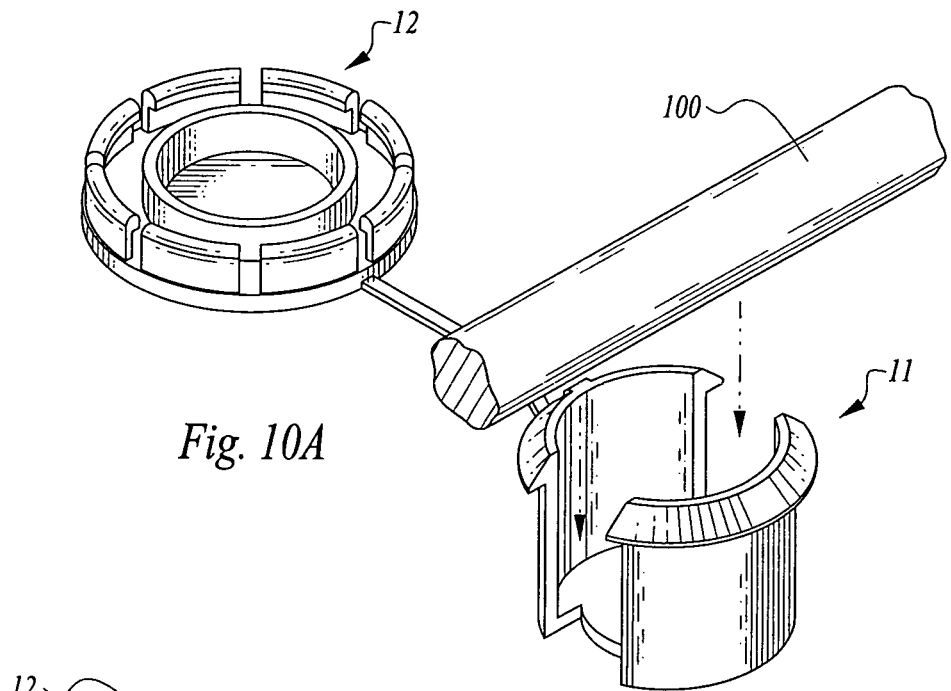
FIG. 10 is a bottom perspective view in closed position.
Figure 10B:
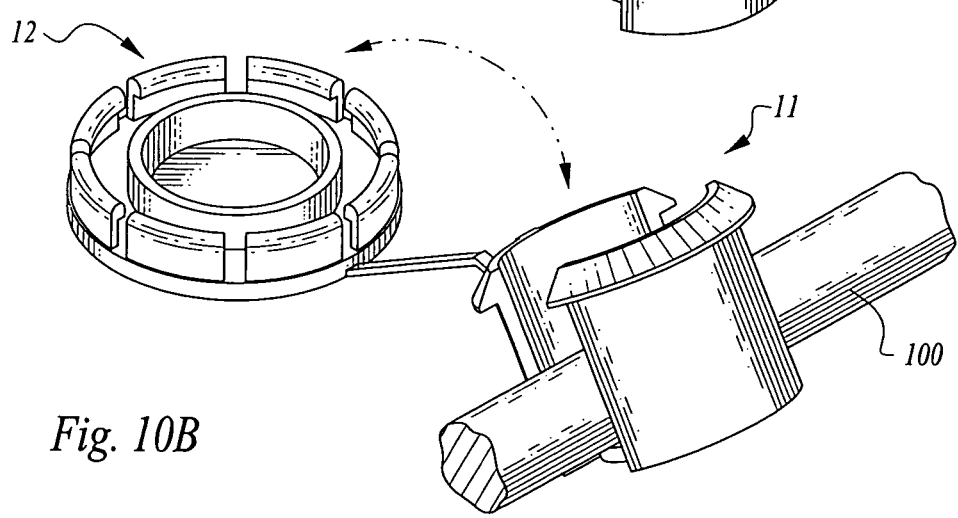

FIG. 10 is a diagrammatic view showing the steps for securing a cable or several wires—both designated 100—within the slot 31-33 in the receiving portion 11. These steps are numbered as (1), (2) and (3). Thus the cable or wires 100 is/are placed in the slot 31-33 in the cup-like receiving portion as shown in FIG. 10 (1) The user then rotates one of the two portions toward the other as shown by the double ended arow of FIG. 10 (2) to mate the engaging portion 12 to the receiving portion 11. Apply pressure to or one or both portions with the fingers, to dispose the lips of the receiving portion in the ring space 28—seen in FIG. 1—such that each of the inward extending lips 18A-L through 18H-L becomes disposed underneath the horizontal surface of the rims 21, 23 to secure the engaging portion to the receiving portion. See FIG. 10 (3). In FIG. 11, the FIGURE illustrates the application of finger pressure onto the two portions 11 & 12 to ensure engagement.

FIG. 12 illustrates the diagrammatically the construction of the notation tab 80 which is constructed in a plurality of layers much like peel and stick labels available in the marketplace. Thus the lowermost layer is a peelable cover layer, 83, which may contain an extended tab for fast easy removal. The purpose of the cover layer is to cover over the adhesive layer, 82, such it does not stick to places where it is not desired. Such a cover layer protects Band-Aid® and other branded bandages. The third layer up is the printable surface, 81, capable of receiving a QR code or micro-QR code marking. The top layer, 84, is an optional clear coat to prevent the code indicia from smearing or wearing off over time. Tabs bearing QR code can be printed on QR code generator printers available in the marketplace.

QR code is the abbreviation for Quick Response Code, It is a type of matrix bar code first designed by Toyota Motor Car Company in Japan Bar codes are optical machine readable labels or labeling attached to items that record information pertaining to the item. QR codes have become widely adopted due to fast readability and greater storage capacity as compared to standard UPC bar codes which are just a series of numbers and sometimes letters interspersed therein. The information encoded can relate to almost any type of data, such that the coded elements of black square dots arranged in a square grid on a white background can be ready an imaging device such as a camera, smart phone, using readily available low cost software, QR code both standard and micro can be read as well by QR code readers, which can be ordered from companies on the internet such as at www.mobile-barcoes.com among others.

By putting QR code or micro QR code information on cable organizers, space can be saved by not having to attach large labels for the receipt of information onto wires and cables. not make mistakes. What previously may have required a cable tie and a placard about 1.5 inches long by ¾ inch wide, is now replaced by a small round surface of just over ½ inch in diameter. The label size for stick-on QR labels is about 15 mm×15 mm and can be of such materials as paper, polyester or Mylar® among others. Blank labels are available pre-cut on 8.5×11 inch sheets of paper for printing on an office inkjet printers Indeed even hand held QR code printers are also available. See for example the Brother® International QL line of printers among others that retail for as low as $60.00. Other vendors of QR code label printers include Zebra™ and Datamax for higher priced units. The QR tab 80 may be applied to the flat surface of the engaging portion of the notator, either prior to or subsequent to the placement of wire/cable in the device and the engagement of the two portions.

It is seen that applicant has uncluttered locations where a plethora of cable and wires are located by allowing each such cable or wire to carry its own small identifying information badge of honor for quick easy machine reading.

The devices of this invention may be provided in various materials, and in various colors which themselves can be used as an identifier such as of voltage, room in a building etc. as a secondary source of information over and above the QR code message. Typical materials useful for these devices includes, nylon, polypropylene and polyethylene among other resins.

While the size shown and the bulk of the discussion has been on the use of micro-QR code labels of about 0.5 inch× 0.5 inch, standard QR labels can also be attached to larger sized devices of the invention. In the alternative the receiving portion 11 can be maintained as shown, but the diameter of the base 22 of the engaging portion can be increased to accommodate the receipt of larger printed tabs of standard QR size.

It is to be understood, that if a cable is rerouted, or changes made to one or more wires in the slot 31-33, that the device of this invention can be removed by urging the two portions apart. One can accomplish this by use of the finger nail, or optional screwdriver or other pressure applying device. In such instance either a new device with current QR marking code can be attached to the cable or with slight difficulty the tab removed and replaced by a new coded tab.

As mentioned supra, the QR code tab of this invention will recited information about the cable or wires to which it is attached. Such information can include both near end (proximal) and far end (distal) information. Typically such information would be the building or building # if within a complex, floor, cubicle or closet, cabinet, and down to shelf and port. Other information can also be encoded such as circuit description, or functionality, such as Human resources Dept, or Accounting, or anything else desired by the users.

While QR code generators exist in the marketplace, there may be an initial learning curve to be able to code the tabs used on this device for the information desired by the user of these devices. It may be easier for the end user to utilize a cable or wire specific code generator from applicant with a pointer to a specific database managed by applicant or the end user that will allow for quick and easy generation of the tabs needed for the specific use of the customer. Applicant will complete a frame or shell of code such that an application for specific wire and cable information can be generated by the customer, as opposed to a computer program relating to the contents of a box of men's shirts.

Since certain changes may be made in the above devices without departing from the scope of the invention herein involved, it is intended that all matter contained in the above description and shown in the accompanying drawings shall be interpreted as illustrative and not in a limiting sense.

I claim:

1. A notator device carrying QR/micro QR indicia concerning the wire(s)/cable, which wires/cable are to be disposed in the notator, said device comprising a first QR code indicia bearing engaging portion and a second cup like shaped receiving portion for disposition of wires/cable, wherein the receiving portion is fixedly attached to the first or indicia carrying engaging portion by a junction member which receiving portion is matingly engage able, with the engaging portion for retaining wires/cable therein, and providing information about the nature of function or location of the wires/cable, and the QR/micro code is printed on a self adhesive tab attached to the engaging portion of the device and wherein said tab has a plurality of layers, the lowermost of which is the adhesive layer applied directly to the underside of the base of the engaging portion, the intermediate layer is QR code or micro OR code marking receiving surface and the tab is sized to not extend beyond the confines of said engaging portion.

2. The notator device of claim 1 wherein the engaging portion has a flat outer surface and the QR/micro QR code is printed on a self adhesive tab attached to the outer surface of the engaging portion of the device and the tab is circular.

3. The notator of claim 1 wherein the receiving portion of this device comprises a cup-like portion having a disc base and two upstanding spaced side wall segments, each of which has a semi-circular base which side wall bases are attached to the disc base along their respective diameters.

4. The notator of claim 3 wherein each wall segment of the receiving portion has an outward extending top lip, and each lip has an arcuate side surface and a horizontal bottom surface normal to the wall.

5. The notator of claim 3 wherein each of the two sidewall segments are arcuate in cross section, and each has an outward extending lip.

6. The notator device of claim 5 wherein the outward extending lip of the two wall segments has an arcuate side surface and a horizontal bottom surface normal to the respective wall segment and the tab further includes a clear coat to prevent smearing of the code.

7. The notator device of claim 6 wherein one outward extending lip has an interruption space therein to permit the shorter rod like member of the junction member to fit flush against the wall segment when the two portions of the device are engaged.

8. The notator device of claim 3 wherein the bi-sector of each the two spaces between the two upstanding spaced side wall segments of the receiving portion is a diameter line of the circular base of said receiving portion.

9. The notator device of claim 1 wherein the junction member has a first shorter rod like segment that is attached flexibly to the outside surface of the receiving portion at about the midpoint of the elevation thereof and a longer flexible rod like member connected on one end to the shorter rod like member spaced up from the distal end thereof and which junction member is disposed at an angle of about 120 degrees, and the other end of the longer rod like member is connected at the base of the engaging portion, and the tab is circular.

10. The notator device of claim 9 wherein the junction member is attached to the engaging portion at a location between spaced two wall segments.

11. The notator device of this device comprises a cup-like portion having a disc base and two upstanding spaced side wall segments, each of which has a semi-circular base which side wall bases are attached to the disc base along their respective diameters.

12. The notator device of claim 1 wherein the engaging portion has a flat circular base having a central annulus shaped segment on its inner surface, and a second flat area also round in configuration outside the annulus, and spaced from the second flat area at the outer edge of the base is a series of upstanding spaced wall segments each with an inward extending lip at the top thereof and the tab includes a clear coat to prevent smearing of the code.

13. The notator device of claim 12 wherein there are eight upstanding wall segments, each of which is arcuate, and the tab is circular.

14. A process for identifying wire(s)/cable to be disposed in a notator having a cup-like receiving portion and an engaging portion having a flat outer surface, the two portions being joined by a flexible junction member, which process comprises:
  (A) placing the wire(s)/cable in the cup like receiving portion of the notator,
  (B) rotating the engaging portion and the receiving portions toward each other,
  (C) matingly engaging the two portions, and
  (D) applying a self adhesive tab bearing QR or micro QR code with identification information concerning the wire(s)/cable in said notator to the flat outer surface of said engaging portion wherein said tab is sized to fit within the confines of said engaging portion.

15. The process of claim 14 wherein the step (D) of applying the self adhesive tab is carried out prior to the placing, rotating and matingly engaging steps.

16. A notator device carrying QR/micro QR indicia concerning the wire(s)/cable, which wires/cable are to be disposed in the notator,
said device comprising a first QR code indicia bearing engaging portion and a second cup like shaped receiving portion for disposition of wires/cable, wherein the receiving portion is fixedly attached to the first or indicia carrying engaging portion by a junction member which receiving portion is matingly engage able with the engaging portion for retaining wires/cable therein, and providing information about the nature of, function or location of the wires/cable,
wherein the receiving portion of this device comprises a cup-like portion having a disc base and two upstanding spaced side wall segments, each of which has a semi-circular base which side wall bases are attached to the disc base along their respective diameters,
and wherein the engaging portion has a flat circular base having a central annulus shaped segment on its inner surface, and a second flat area also round in configuration outside the annulus, and spaced from the second flat area at the outer edge of the base is a series of upstanding spaced wall segments each with an inward extending lip at the top thereof,
the QR code indicia being a self adhesive tab disposed upon the outer surface of the engaging portion, said tab being sized to fit within the confines of said engaging portion, said tab being circular in configuration.

17. The notator device of claim 16, wherein the two portions are connected by a flexible junction member one of which is attached to each portion and said tab further includes a top op clear coat to keep the code from smearing.

18. The notator device of claim 17 wherein the junction member has two rod like members linearly aligned.

\* \* \* \* \*